United States Patent [19]
Aebersold et al.

[11] Patent Number: 6,053,392
[45] Date of Patent: Apr. 25, 2000

[54] METHOD AND APPARATUS FOR CONNECTING TWO METALLIC WORKPIECES TOGETHER

[75] Inventors: Hans Aebersold, Birmensdorf; Norbert Gross, Zürich; Werner Urech, Kaiserstuhl, all of Switzerland

[73] Assignee: Elpatronic AG, Bergdietikon, Switzerland

[21] Appl. No.: 08/948,310

[22] Filed: Oct. 9, 1997

Related U.S. Application Data

[62] Division of application No. 08/647,176, May 9, 1996, Pat. No. 5,878,944.

[30] Foreign Application Priority Data

May 15, 1995 [CH] Switzerland .......................... 01407/95

[51] Int. Cl.⁷ .................................................. B23K 37/04
[52] U.S. Cl. .................... 228/5.7; 228/44.3; 228/49.4; 219/121.63; 219/121.82; 219/161; 269/8
[58] Field of Search .......................... 228/212, 5.7, 44.3, 228/49.4; 219/121.63, 121.64, 121.82; 335/285; 269/8

[56] References Cited

U.S. PATENT DOCUMENTS 4,840,303   6/1989   Fujii et al. ................................ 228/164

*Primary Examiner*—Samuel M. Heinrich
*Attorney, Agent, or Firm*—McCormick, Paulding & Huber LLP

[57] ABSTRACT

In a process for joining two metallic workpieces together, the pieces are butted together to form a butt joint and are joined to one another in the region of the butt joint. During this operation, the workpieces are subjected to a magnetic attraction force at one side, and. can be subjected to hold-down pressure on the opposite side.

7 Claims, 2 Drawing Sheets

METHOD AND APPARATUS FOR CONNECTING TWO METALLIC WORKPIECES TOGETHER

This is a divisional of application Ser. No. 08/647,176 filed on May 9, 1996, now U.S. Pat. No. 5,878,944.

BACKGROUND OF THE INVENTION

The invention relates to a method and apparatus for connecting two workpieces together by welding, in which the workpieces lie on supporting surfaces, are in particular butted together at their edges to form a butt joint or are disposed in an overlapping relationship, and are subjected to pressure on the opposite side to the supporting surfaces.

Various welding processes are known for joining two workpieces together, particularly for the fabrication of body components for motor vehicles. Especially worthy of note is laser welding in which the sheet metal parts are butt-welded to form compound panels. However, other welding processes too are within the scope of the invention.

A laser welding operation is usually carried out in the following manner.

The workpieces are butted together in pairs, without prepared edges, positioned without significant sideways pressure, and fixed by-means of clamp elements. A first application of force to the workpieces occurs at this stage. The workpieces may then be processed, for example they may be dressed, as described in EP-A 0565846, to bring the gap within tolerance. This processing causes a second application of force to the positioning system, in which considerable lateral forces can occur. Finally, further, mainly sideways-acting force effects occur as a result of thermal stresses in the laser welding process.

It is important to find a way of blocking the lateral forces which occur. For example, if pretreatment by dressing or profiling is performed in accordance with EP-A 0565846, the average lateral force, that is to say the (horizontal) lateral force averaged over the length of the weld seam, which occurs as a result of such pretreatment can be as high as 30N/mm. Thermal stresses due to welding yield an additional average lateral force of 20N/mm which also needs to be blocked. This means that on a workpiece approximately 1600 mm long, a (vertical) clamping pressure of approximately 10t has to be exerted. To apply such a pressure to the workpieces, heavy pressure drives and elements, and also massive structures, are required. These need costly steel constructions and larger motors if for example they are designed to be traversable. This in turn leads to structural problems in the machine itself, which reaches a size and weight that have to be taken into account when the machine is installed.

One possibility which suggests itself for making the fixing of the workpieces more secure is to provide the surfaces of the machine table and/or pressure elements with friction coatings which increase the coefficient of friction However, only limited improvement can be gained in this way, and furthermore such friction coatings are liable to become clogged with the kind of dirt which arises in the laser welding process—greasy dust due to the subsequent cooling with oil, for example.

SUMMARY OF THE INVENTION

The object which lies at the basis of the present invention is to develop a method and an apparatus of the above-mentioned kind by means of which the lateral forces which occur can be blocked and the workpieces are fixed more securely in the joining process, using the same, or even less massive, structures.

The method of achieving this object is to subject the workpieces to a magnetic force.

Preferably the workpieces are both pressed against a machine table and magnetically attracted by the machine table. The workpieces are thus acted on by two different forces. These forces do not simply combine, but, surprisingly, the holding force on the workpiece is increased by a disproportionate amount. This can completely prevent the workpieces from slipping in the welding operation. An increase in clamping pressure, and the massive machine structure which this entails, is no longer necessary.

Moreover, it is feasible to provide for a magnetic field intensity which varies over the length of the workpiece. This means for example that it can be arranged for the workpiece to be attracted more strongly in the central area than in the marginal areas in which the pressure elements have a better grip on the workpiece. There are many possible alternatives which should be considered as embraced by the invention.

A simple apparatus for carrying out the method has at least one magnet element in the machine table, with which a pressure element is associated. The pressure element may be in the form of edge clamps. However, it is preferred to use a continuous pressure beam which lies on the workpiece over its entire length.

Alternatively, instead of one continuous magnet element, a number of individual elements may be arranged side by side.

In the case of thin sheets, say 1–4mm thick, it may be that the field lines pass through the sheet. Therefore an additional layer of preferably ferromagnetic material may be provided between the pressure element and the sheet, ensuring optimum formation of the magnetic field and maximum effect. The pressure element itself, where it rests on the sheet, can likewise be made of ferromagnetic material.

It is also feasible to subject the juxtaposed workpieces to different magnetic orientations. This means that the workpieces will be attracted to each other in the region of the weld joint itself, reducing the width of the gap. This particularly improves the quality of the welded seam.

It is also possible to realise the invention in a continuous feed arrangement according to US 5328083, eg. by providing the endless tracks with magnets.

BRIEF DESCRIPTION OF THE DRAWINGS

Further advantages, features and particulars of the invention will be disclosed in the following description of preferred embodiments given by way of example, and with reference to the drawings, in which.

DESCRIPTION OF THE PREFERRED EMBODIMENT

Figure 1:
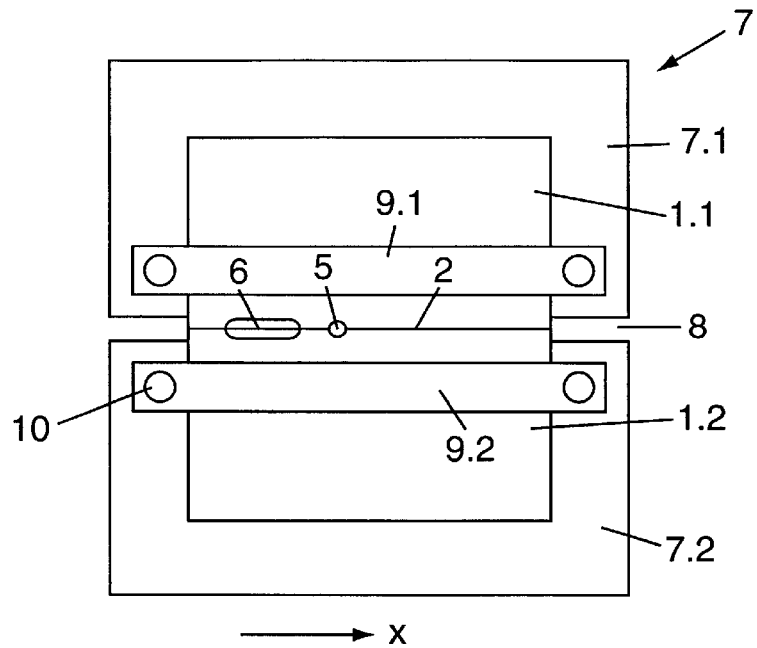
FIG. 1 is a diagrammatic plan view of an apparatus for joining two workpieces together by laser welding.
Figure 2:
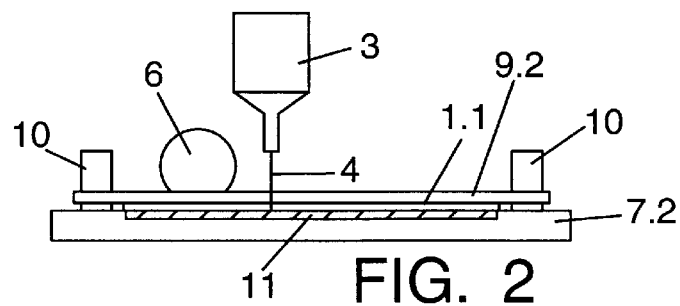
FIG. 2 is a diagrammatic side view of the apparatus according to FIG. 1.

As shown in FIG. 1, two workpieces 1.1 and 1.2 are to be joined to one another by welding, in particular by laser welding. The two workpieces 1.1 and 1.2 lie with their edges butted together forming a butt joint 2. They are joined to one another in the region of the butt joint 2 by a laser 3 (see FIG. 2) which directs a laser beam 4 on to this butt joint 2. In FIG. 1 a point of impingement is shown at 5.

Both workpieces 1.1 and 1.2 are traversed in the direction x with respect to the laser 3, and a profile roller 6 is positioned ahead of the laser 3 as described in detail in EP-A 0565846. The profile roller 6 produces a groove in the region of the butt joint 2, displacing material towards the butt joint 2 and thereby reducing the width of the butt joint 2 to a minimum. This process is also called "dressing".

Both workpieces 1.1 and 1.2 lie on a machine table 7, which in the present case is constructed in two sections. A gap 8 is formed between the two machine table sections 7.1 and 7.2, and the laser beam 4 is able to pass through this gap.

The workpieces 1.1 and 1.2 are clamped to the machine table sections 7.1 and 7.2 respectively. This is done by providing at least one pressure beam 9.1 and 9.2 on each section, pressing down as uniformly as possible over the entire length of the workpieces 1.1 and 1.2 respectively.

The pressure beams 9.1,9.2 can be subjected to the required pressures by corresponding pressure drives 10 acting at both ends or distributed over their length. Examples of suitable pressure drives are hydraulic or pneumatic cylinders, but electrical or mechanical pressure elements might be used; there is no intention to restrict the idea of the invention in this respect.

What is significant for the present invention is that least one magnet element 11 (see FIG. 2) should be embedded in the machine table sections 7.1 and 7.2. This magnet element 11 may consist of one continuous plate, but it is also feasible for it to be made up of small separate elements. It is also feasible for the individual elements to have different orientations, and/or to be operated with different magnetic field intensities.

Figure 3:
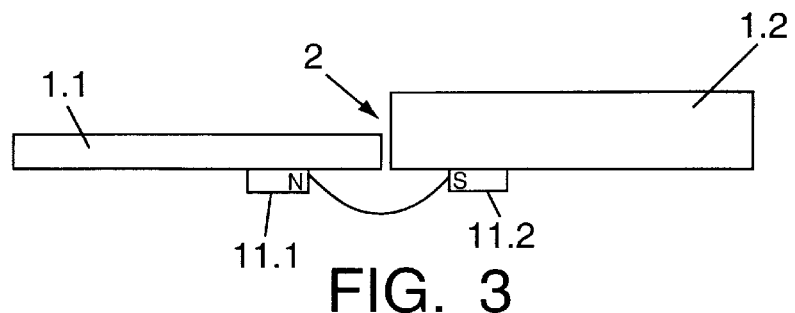
FIG. 3 is a diagrammatic front view of two workpieces with a variant for reducing a joint gap.

In a further embodiment of the invention according to FIG. 3, the two magnet elements 11.1 and 11.2 in the machine table sections 7.1 and 7.2 have different orientations. This makes it possible to influence the two workpieces 1.1 and 1.2 magnetically-so that a magnetic force is applied in the region of the butt joint 2 which pulls the two workpieces 1.1 and 1.2 together whereby the width of the joint gap 2 is reduced. This results in a better welded seam.

Practical experiments have demonstrated that the holding force experienced on the workpieces 1.1 and 1.2 from the pressure beams 9 and the magnet elements 11 is greater, by a disproportionate amount, than the holding force of the pressure beams or magnet elements acting on their own. The holding forces are not simply additive but are increased by a disproportionate amount. Furthermore, waviness or warping of the workpieces 1.1 and 1.2 is prevented, especially after the laser welding. But above all it is not necessary to have costly constructions and massive structures in order to produce a sufficient clamping force.

It has also been found that the chosen method of fixing the workpieces 1.1 and 1 2 results in better dissipation of heat.

Figure 4:
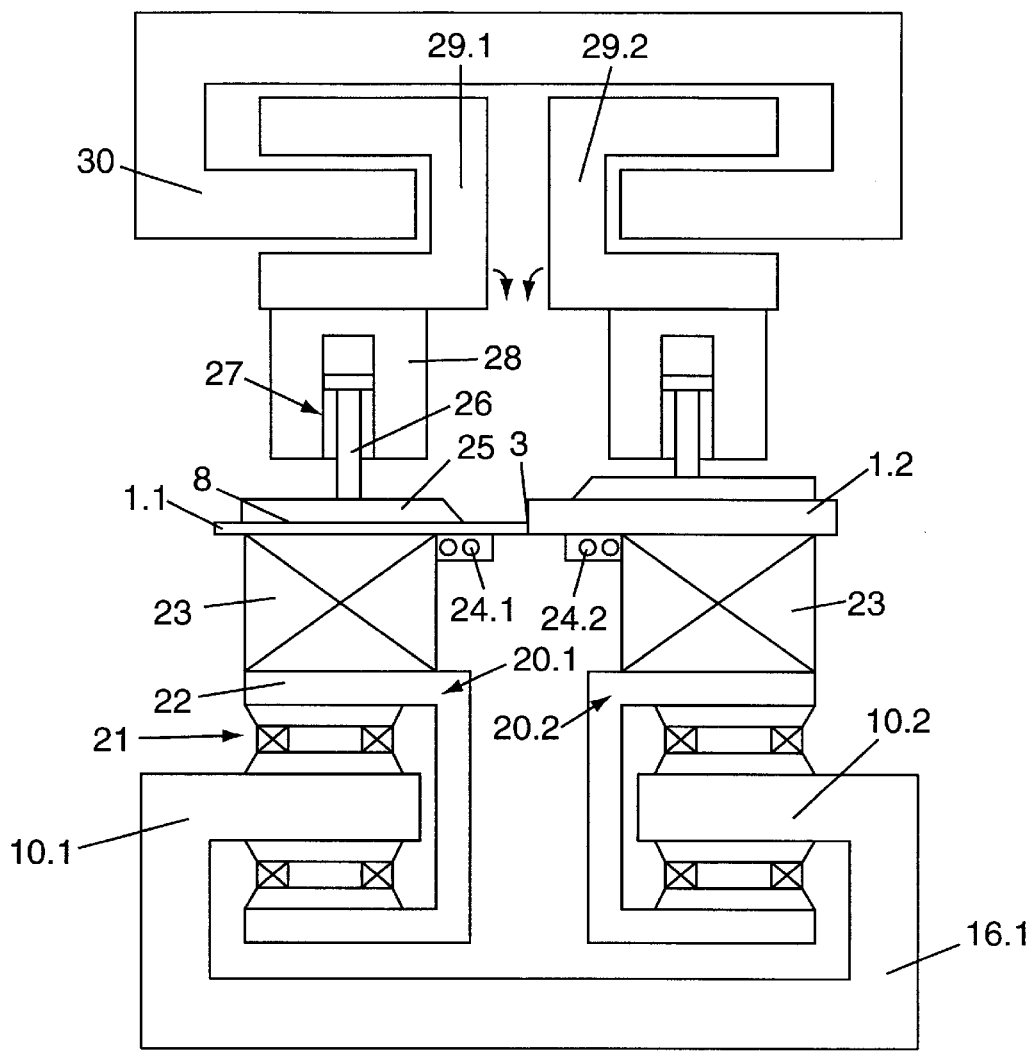
FIG. 4 shows a cross-section through an apparatus according to the invention which uses a shuttle for welding several sheet-pairs.

FIG. 4 is a cross-section through an apparatus for carrying out the invention. It shows a machine frame 16.1,30, with limbs of the lower part 16.1 of the frame specifically designated 10.1 and 10.2. A clamping table or shuttle 20 runs on the frame 16.1,30, and is supported thereon by C-shaped elements 20.1,20.2,29.1,29.2. Magnets 23 form the supporting surfaces for the sheets 1.1 and 1.2. Press shoes 25, preferably of ferromagnetic material, are pressed against the sheets 1.1,1.2 by pressure elements 27. The pressure due to the pressure elements 27 combines with that of the magnets 23 with more than proportionate effect, with the result that the arrangement is able to sustain more than proportionately greater lateral forces. Dissipation of heat due to the welding in the joint 3 is assisted by the cooling ducts 24.1 and 24.2.

Figure 5:
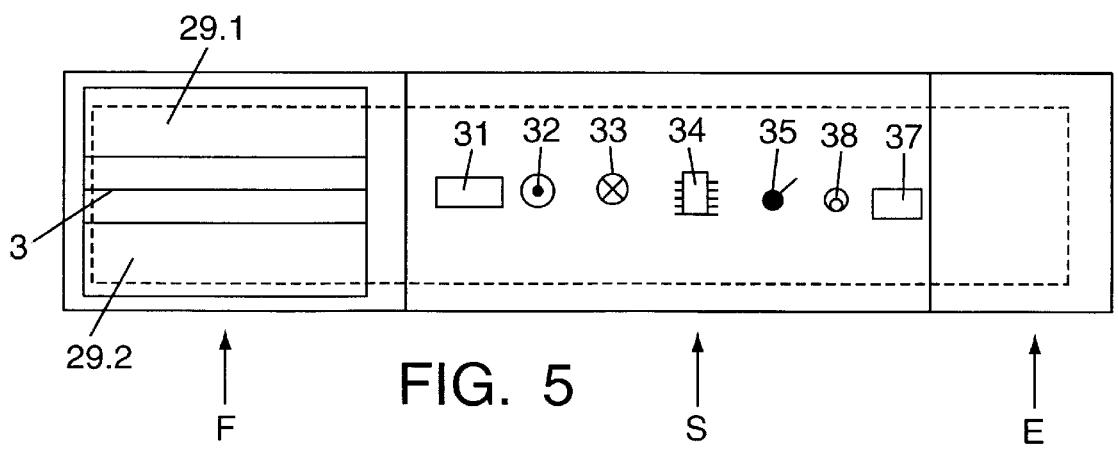
FIG. 5 is a plan view of the apparatus shown in FIG. 4.

From FIG. 5 it can be seen that the shuttle, of which only the two yokes 29.1 and 29.2 are visible, runs along the whole length of the apparatus. At the point shown it is in a loading station F, from which it passes to a welding station S, and thence to an unloading station E from which the welded workpieces are removed.

In the welding station, the butt joint is preferably dressed by a dressing unit 31 as described in EP-A 0565846. The dressing unit 31 is preferably followed by a gap monitor 32 allowing a laser beam 2 located next along the machine to track the line of the gap.

After the butt joint has been welded by the laser 33, the weld seam is preferably treated in a brushing unit 34 and oiled in a cooling station 35. These treatments are followed by a quality inspection 36 and, if necessary, dressing 37.

The workpieces 1.1 and 1.2 pass through all these treatments while clamped to the shuttle.

We claim:

1. Apparatus for connecting two metallic workpieces together by forming a butt joint comprising elements for performing the connecting operations including:

a laser welding device for metal sheets;

a clamping table or continuous feed arrangement for applying pressure to and holding the workpieces to be welded, which can also guide the sheets in the lateral direction, by frictionally engaging elements; and at least one magnet element acting on one side of the workpieces and creating a magnetic field acting on the workpieces which field is substantially confined to a ferromagnetic path between the locations where the magnetic field passes into and out of said one side of the workpieces.

2. Apparatus according to claim 1, characterized in that a pressure element is arranged on the side of the workpieces opposite to the magnet element.

3. Apparatus according to claim 2, characterized in that the pressure element comprises a pressure beam acted on by at least one pressure drive.

4. Apparatus according to claim 2 characterized in that the pressure element comprises a ferromagnetic material.

5. Apparatus according to claim 1, characterized in that the magnet element is embedded in a machine table.

6. Apparatus according to claim 1, characterized in that the magnet element is made up of a plurality of individual elements.

7. Apparatus according to claim 6, characterized in that the individual elements of the magnet element have different field intensities.

* * * * *